(12) United States Patent
Merkle et al.

(10) Patent No.: US 11,490,744 B2
(45) Date of Patent: Nov. 8, 2022

(54) DISPLAY CASE EQUIPPED WITH INFORMATIONAL DISPLAY AND SYNCHRONIZED ILLUMINATION SYSTEM FOR HIGHLIGHTING OBJECTS WITHIN THE DISPLAY CASE

(71) Applicant: Fresnel Technologies Inc., Fort Worth, TX (US)

(72) Inventors: Denise Lynn Merkle, Fort Worth, TX (US); Nelson Claytor, Fort Worth, TX (US); Margaret Fraelich, Fort Worth, TX (US); Timothy Cobb, Fort Worth, TX (US)

(73) Assignee: Fresnel Technologies Inc., Forth Worth, TX (US)

( * ) Notice: Subject to any disclaimer, the term of this patent is extended or adjusted under 35 U.S.C. 154(b) by 0 days.

(21) Appl. No.: 16/780,836

(22) Filed: Feb. 3, 2020

(65) Prior Publication Data

US 2021/0100371 A1    Apr. 8, 2021

Related U.S. Application Data

(60) Provisional application No. 62/800,562, filed on Feb. 3, 2019.

(51) Int. Cl.
| | |
|---|---|
| *G06F 3/02* | (2006.01) |
| *G06F 3/14* | (2006.01) |
| *A47F 3/00* | (2006.01) |
| *H05B 47/165* | (2020.01) |

(52) U.S. Cl.
CPC ............. *A47F 3/001* (2013.01); *G06F 3/02* (2013.01); *G06F 3/14* (2013.01); *H05B 47/165* (2020.01)

(58) Field of Classification Search
CPC ... G06F 3/02; G06F 3/14; A47F 3/001; H05B 47/165
See application file for complete search history.

(56) References Cited

U.S. PATENT DOCUMENTS

| | | | |
|---|---|---|---|
| 9,037,985 B2 | 5/2015 | Yamamoto et al. | |
| 9,514,661 B2 * | 12/2016 | Riegel | ............... H04N 5/64 |
| 2008/0047186 A1 | 2/2008 | Strickland | |

(Continued)

OTHER PUBLICATIONS

Miller, Paul. "How to Perfect Your Trade Show Presentation." ProExhibits, Oct. 24, 2019, www.proexhibits.com/blog/trade-show-presentations/.

(Continued)

*Primary Examiner* — Kevin M Nguyen
(74) *Attorney, Agent, or Firm* — John A. Fortkort; Fortkort & Houston PC

(57) ABSTRACT

A system for displaying a plurality of objects is provided. The system includes at least one display case which houses the plurality of objects such that each of the plurality of objects is visible from outside of the at least one display case; a lighting system; an electronic display; and a control system which causes each of said plurality of objects to be successively displayed on the electronic display, and which manipulates the lighting system such that, while each of the plurality of objects is being displayed on the electronic display, the object being displayed is simultaneously highlighted in the at least one display case by the lighting system.

19 Claims, 3 Drawing Sheets

(56) References Cited

U.S. PATENT DOCUMENTS

| | | | | |
|---|---|---|---|---|
| 2013/0211583 | A1* | 8/2013 | Borra | G07F 9/023 |
| | | | | 700/232 |
| 2014/0043433 | A1* | 2/2014 | Scavezze | G02B 27/0172 |
| | | | | 348/42 |
| 2014/0168929 | A1 | 6/2014 | Terry | |
| 2014/0368537 | A1* | 12/2014 | Salter | G06T 19/006 |
| | | | | 345/633 |
| 2015/0309578 | A1* | 10/2015 | McCoy | G06F 3/0484 |
| | | | | 715/863 |
| 2016/0183350 | A1* | 6/2016 | Van De Sluis | H05B 45/10 |
| | | | | 315/308 |

OTHER PUBLICATIONS

"Synchronized Lighting for Your Corporate Video or Trade Show Event" Starmark, Starmark Innovation Lab, Dec. 30, 2019, www.starmark.com/lab/synchronized-lighting-corporate-video-trade-show-event/.

"Trade Show Booth Featuring Integrated Synchronized Media AVFX Event Technology." AVFX Event Technology, WFX, LLC, Nov. 12, 2019, www.avfx.com/at-himms-2019-message-technology/.

"Trade Show Lighting, Exhibit Accessories, Accent Lighting" The Trade Group, Nov. 22, 2017, www.tradegroup.com/resources/blog/light-it-up-should-you-add-accent-lighting-to-your-exhibit/.

"VenueMagic Classic." VenueMagic Show Control Software, Jul. 22, 2014, www.venuemagic.com/venuemagic-classic/.

"Products." VenueMagic Show Control Software, Apr. 12, 2013, www.venuemagic.com/products/.

* cited by examiner

DISPLAY CASE EQUIPPED WITH INFORMATIONAL DISPLAY AND SYNCHRONIZED ILLUMINATION SYSTEM FOR HIGHLIGHTING OBJECTS WITHIN THE DISPLAY CASE

CROSS-REFERENCE TO RELATED APPLICATION

This application claims the benefit of U.S. provisional application No. 62/800,562, filed Feb. 3, 2019, having the same title, and having the same inventors, and which is incorporated herein by reference in its entirety.

FIELD OF THE DISCLOSURE

The present disclosure pertains generally to the display of objects for viewing, and more particularly to systems and methodologies for displaying a plurality of objects in a display case equipped with an electronic display and a lighting system such that a set of images of the objects are successively rendered on the electronic display, and such that each object is simultaneously highlighted by the lighting system while it is being displayed on the electronic display.

BACKGROUND OF THE DISCLOSURE

It is desirable to display sets of objects in display cases for various purposes. These include, for example, displaying objects at a tradeshow or in a museum. It is frequently also desirable to provide information about the objects being displayed. This information may be presented in an associated audio file or in text or graphics associated with the object.

By way of example, U.S. 2008/0047186 (Strickland) discloses a memorabilia display case which includes a portion designed to hold and display an article of memorabilia, and a portion configured to output media related to the memorabilia. One example of such a display case includes a mount for holding a jersey, ball, or other sports memorabilia, as well as a display screen and speakers for playing a video clip of the team, player, and/or event related to the displayed memorabilia. In some embodiments, the case includes a lighting system to facilitate viewing of the memorabilia.

Synchronized lighting has been utilized in some tradeshow exhibits. For example, the Sync My Lights application may be utilized to add lighting effects synchronized by time code to a lighting system. This application has been utilized to synchronize a lighting system directly with a video presentation in order to create a more immersive user experience. See, for example, "SYNCHRONIZED LIGHTING FOR YOUR CORPORATE VIDEO OR TRADE SHOW EVENT", available at www.starmark.com. Similar software is commercially available from other vendors as well. For example, VenueMagic® Show Control Software allows users to create lightshows with synchronized video, audio and DMX lighting using a graphical timeline-based editor. Multi-track mixing of video, audio clips and lighting effects is said to allow the user to create shows with synchronized video, audio and lighting effects.

SUMMARY OF THE INVENTION

In one aspect, a system is provided for displaying a plurality of objects. The system comprises (a) at least one display case which houses said plurality of objects such that each of said plurality of objects is visible from outside of said at least one display case; (b) a lighting system; (c) an electronic display; and (d) a control system which causes each of said plurality of objects to be successively displayed on said electronic display, and which manipulates the lighting system such that, while each of said plurality of objects is being displayed on said electronic display, the object being displayed is simultaneously highlighted in said at least one display case by the lighting system.

In another aspect, a method for displaying objects is provided. The method comprises (a) providing at least one display case equipped with a lighting system and an electronic display; (b) arranging a plurality of objects in said at least one display case; (c) displaying an image of each of said plurality of objects on said electronic display; and (d) while each image of each of said plurality of objects is being displayed on said electronic display, highlighting that object in the at least one display case with the lighting system.

DETAILED DESCRIPTION

Figure 1:
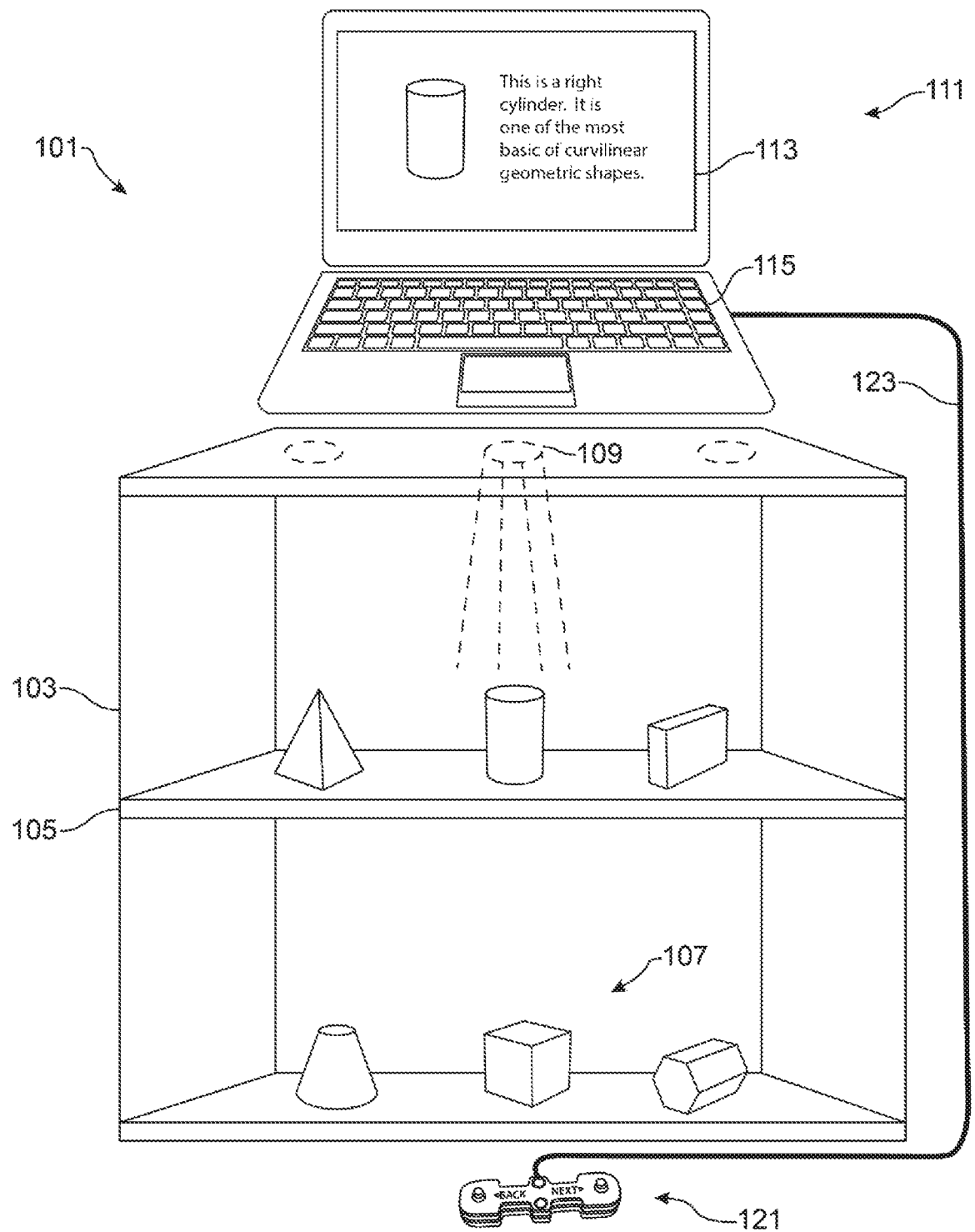
FIG. 1 is a picture illustrating the selective illumination of an object in a display case in accordance with then teachings herein.

As used herein, the term "electronic display" refers to an electronic device upon which, or with which, graphics or text are rendered. Examples include computer screens.

By their nature, tradeshows are events in which many parties are competing for the attention of the event attendees. Consequently, the attention span of attendees at these events is typically quite limited. It is thus important for an exhibitor at a tradeshow to convey information about a product as quickly and efficiently as possible.

A typical exhibit at a tradeshow includes a set of objects being displayed which may be, for example, products being offered for sale by a vendor. While the set of objects is being displayed, it is often desirable to provide information about each object in the set. For example, it may be desirable to provide information about the attributes and benefits of each product.

It is often desirable to automate presentations at a tradeshow, since an exhibit booth may not be manned at all times. Moreover, an ongoing presentation provides a constant broadcast of information about a vendor's products, and often helps to capture the interest of event attendees.

For example, it may be desirable to provide a laptop or other computational device which runs an informational slideshow. In that case, each slide in the slideshow may contain audio, visual, and/or textual information about one of the objects being displayed. The slideshow may run on a loop, so that it is repeated numerous times throughout the day.

Unfortunately, it is often difficult in such a setting for observers to quickly understand which particular object in the display case the slideshow is referring to. Many of the products may appear similar, and the observer may come upon the slideshow at any point in its sequence. Given the typically short attention span of tradeshow attendees, this gap in understanding may cause them to lose interest in the products being exhibited.

It has now been found that the foregoing problems may be addressed with the systems and methodologies disclosed herein. In a preferred embodiment, these systems include a display case which is equipped with a lighting system, and which has a plurality of objects on display in it. A controller (which may be a computational device such as, for example, a laptop computer) equipped with an electronic display is associated with the display case, and controls the lighting system thereof. While information about an object in the display case is being presented on the electronic display, the controller manipulates the lighting system such that the object currently being described is highlighted. Preferably, this is achieved by illuminating the object being described such that that object appears visually brighter than the background and/or the remaining objects in the display. Accordingly, a viewer may immediately appreciate which object in the display case corresponds to the information currently being presented.

A further problem in the art relates to the use of slideshows to convey information about products. A slideshow provided by a vendor may contain information about several products in the vendor's product portfolio. However, a tradeshow attendee may only be interested in a specific product. Consequently, if the tradeshow attendee encounters the slideshow presentation at the wrong time, the attendee may lose interest in the presentation.

It has now been found that the foregoing problems may be addressed with the systems and methodologies disclosed herein. In some embodiments, a slideshow is provided which is interruptible by the user by way of a controller. The controller may include buttons or other selectable controls which allow a user to navigate through the slides of the slideshow. The user may be able to utilize the controller to highlight a particular object ion the display case, in response to which the system may render the corresponding slides or pages of the information display to provide the user with information about the highlighted or selected object. Consequently, if an event attendee indicates interest (through the controller) in a particular product, the slideshow may be rerouted to the portion relating to the product indicated to be of interest. The slideshow may then proceed in its normal sequence from that point, or may return to the point it was at prior to the interruption.

The systems, devices and methodologies disclosed herein may be further understood with respect to the particular, non-limiting embodiment of a display system in accordance with the teachings herein which is depicted in FIG. 1. With reference thereto, the system 101 comprises a display case 103 which, in the particular embodiment depicted, is equipped with a plurality of shelves 105 upon which are displayed a plurality of items 107. The display case 103 is equipped with a lighting system which includes a plurality of light fixtures 109 that selectively illuminate the items 107 displayed therein. For simplicity of illustration, in the particular embodiment depicted these fixtures 109 are only shown for selective illumination of the objects on the first shelf. However, it will be appreciated that the display case 103 may further be equipped with additional light fixtures which are adapted to selectively illuminate objects on the second shelf.

The lighting system is controlled by a controller 111. In the particular embodiment depicted, the controller 111 is a laptop computer disposed on top of the display case 103. The controller 111 is equipped with an electronic display 113, a keyboard 115 (or other input/output devices as are known to the art, including mice and touch-sensitive pads or displays) and a tangible, non-transient memory (not shown) containing an operating system, suitable software, and/or other suitable programming instructions (which may be executed by one or more processors associated with the controller 111) to manage the functionalities of the controller 111.

In use, the controller 111 is programmed to display a slideshow or other presentation on the electronic display 113. The slideshow may contain information about the items 107 displayed in the display case 103, and typically features a succession of windows or slides which are presented in a predetermined sequence.

Figure 2:
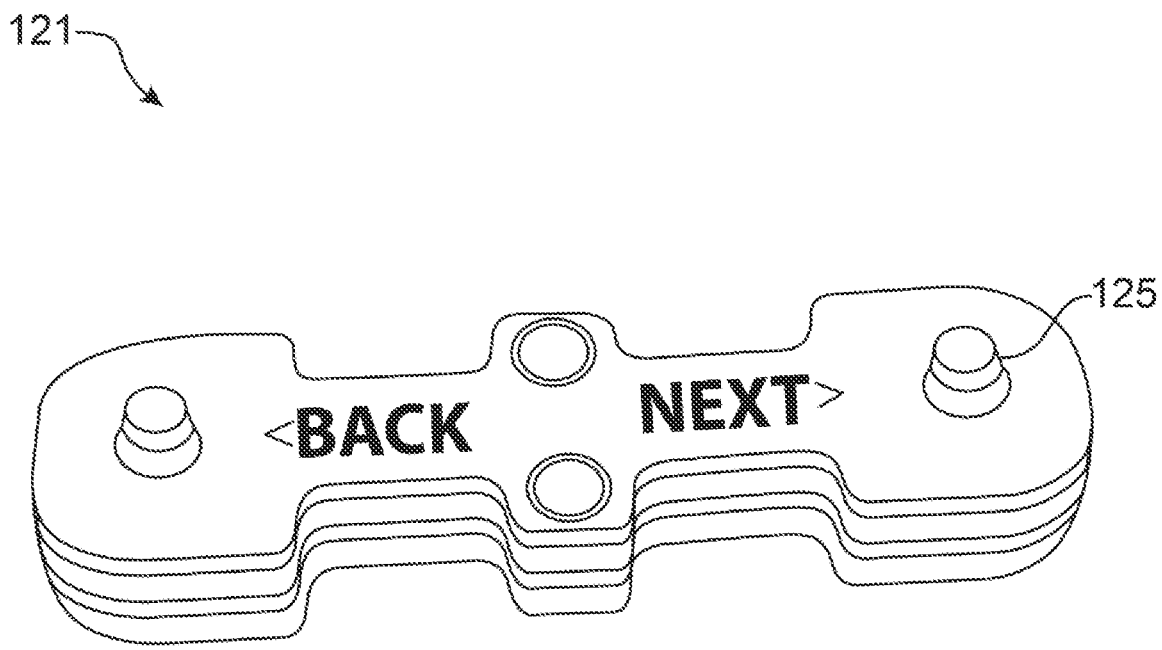
FIG. 2 is a picture of a user interface which may be utilized to toggle through an information presentation associated with objects in the display case.

With reference to FIG. 2, the display case 103 is further equipped with a navigational control 121 which may be in communication with said controller 111 via suitable wired or wireless means. Thus, in the particular embodiment depicted, the navigational control 121 is in communication with the controller 111 via a suitable cable 123 (which may be, for example, an ethernet cable). However, embodiments are also contemplated in accordance with the teachings herein in which the navigational control 121 is in communication with the controller 111 wirelessly as, for example, through the use of one or more radio frequency (RF) transceivers. Such wireless communication may utilize various standards or communications protocols including, for example, the Bluetooth wireless technology standard or the 802.11a, 802.11ac, 802.11b, 802.11g or 802.11n standards.

The navigational control 121 allows a user to selectively highlight items 107 in the display case 103 through the use of buttons 125 or other suitable controls that allow the user to toggle among the displayed items 107. Preferably, highlighting an item includes manipulating the lighting system 109 with the navigational control 121 such that the highlighted item appears brighter than other items in the display case 103. When an item is highlighted by a user in this manner, the presentation on the electronic display 113 preferably jumps to the portion thereof which deals with the highlighted item. The user may continue to highlight items in this manner any desired number of times. The software running the controller will preferably include a timer which is reset each time a user interacts with the system. After the timer runs, the presentation may return to the point it was at before it was first interrupted, or it may proceed forward from its current location.

Figure 3:
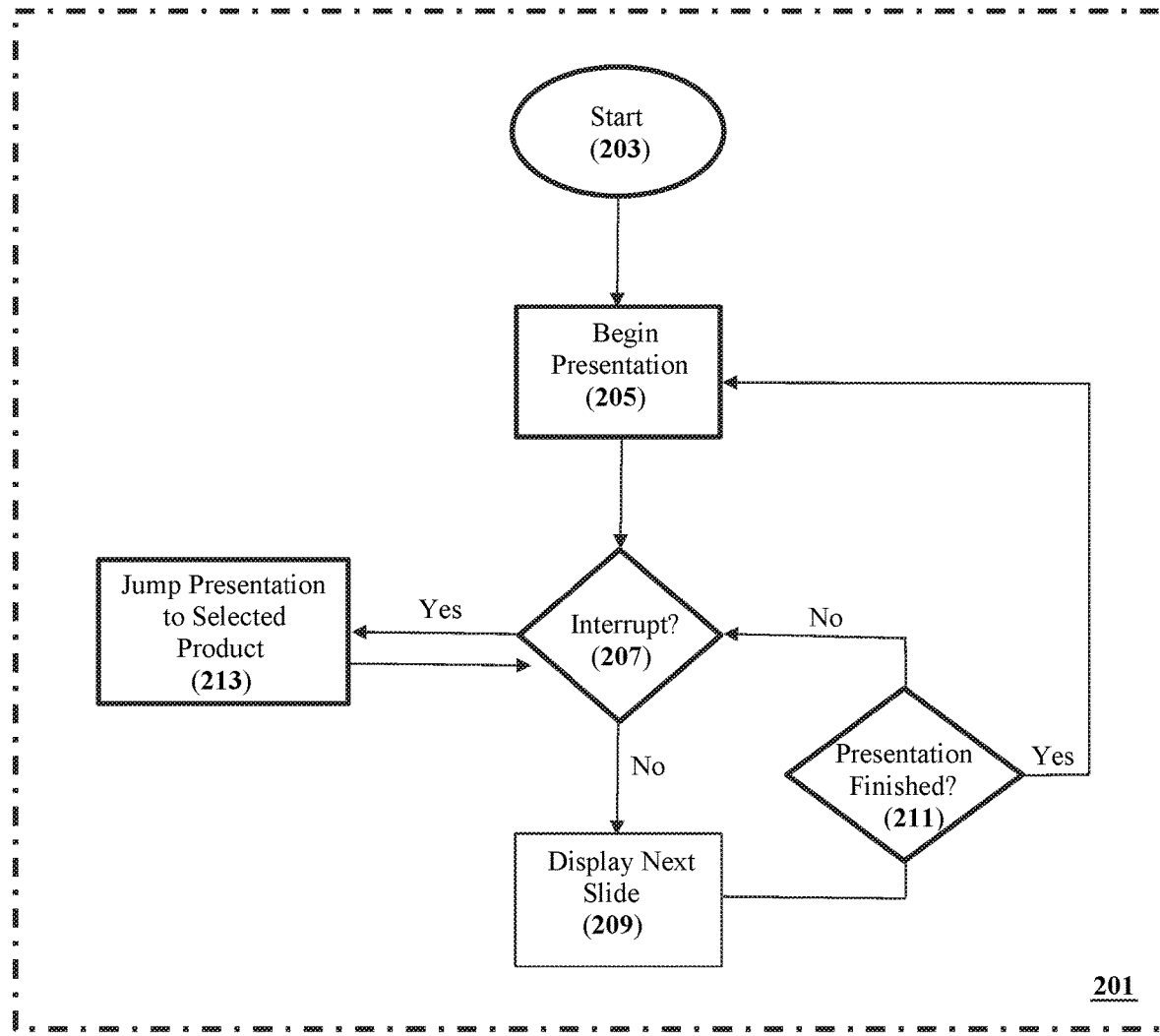
FIG. 3 is an illustration of an embodiment of the methodology disclosed herein for allowing a user to selectively interrupt a presentation.

FIG. 3 depicts a particular, non-limiting embodiment of a process disclosed herein for allowing a user to selectively interrupt a presentation. With reference thereto, the process 201 commences 203 with the beginning of a slideshow 205 or other presentation. The system continuously queries for an interrupt event 207, which may be triggered by a user manipulating the navigational control 121 of FIG. 2. If no interrupt event occurs, the slideshow is allowed to continue 209, and does so until the presentation is finished 211. At that point, the presentation restarts 205, although embodiments are also contemplated in which the presentation terminates at that point.

If an interrupt event does occur, the presentation jumps 213 to the portion of the presentation dealing with the selected product. This process can continue for an indefinite number of interrupts, after which the next slide from the last jump point is displayed (or the presentation restarts, if the last jump point is the last slide in the presentation).

Various display cases may be utilized in the systems and methodologies disclosed herein. Such display cases may include, for example, one or a plurality of shelves upon which the objects are displayed. The shelves may be transparent, translucent or opaque. Preferably, the display case includes one or more windows through which the objects may be observed. In some embodiments, the display case may be a plurality of display cases, though in such embodiments, the plurality of display cases are preferably under control of a single controller and lighting system.

Various lighting systems may be utilized with the systems and methodologies described herein. LED lighting systems are preferable, since the brightness or color of the individual LEDs (or clusters of LEDs) in such systems may be readily adjusted by a controller and offer fast response times. Such systems are also well-adapted to implement directional lighting effects which may be advantageously utilized to emphasize or highlight (e.g., through selective illumination) particular objects in the display case. Such selective illumination may include, without limitation, illuminating the highlighted item with greater intensity than the rest of the plurality of items, or illuminating the highlighted item with a different color light (or light of a different wavelength) than the rest of the plurality of items.

In some embodiments, sets of items may be highlighted. This may occur, for example, where sets of items in the plurality of items are related as through, for example, functionality or product designation.

Preferably, information about the objects in the display case is presented in a presentation which preferably includes a succession of windows or slides, and which is more preferably in a slideshow format. Suitable formats for such presentations include, for example, the PowerPoint presentation format. In some embodiments, each slide may be displayed on the display for a fixed duration. This duration may be the same for all of the slides, or may differ depending, for example, on the amount of information being presented, the complexity or importance of that information, or the track length of any accompanying video or audio content (including, for example, the track length of any accompanying audio narration).

Various modifications are possible to the systems, devices and methodologies disclosed herein without departing from the scope of the present disclosure. For example, while these systems, devices and methodologies have been principally described and illustrated with respect to the selective illumination of an object while an image of the object is being displayed on an electronic display, an object may be selectively illuminated or highlighted when any information particular to that device is being described in any accompanying materials, whether those materials include audio, visual or textual information.

The systems and methodologies disclosed herein may be utilized for various purposes. These include, without limitation, their use in tradeshows, in retail or wholesale settings, in museums, and for educational purposes.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A system for displaying a plurality of objects, comprising:
   at least one display case which houses said plurality of objects such that each of said plurality of objects is visible from outside of said at least one display case;
   a lighting system;
   an electronic display spaced apart from said display case which presents a slideshow of the plurality of objects on said electronic display, wherein each slide in the slideshow depicts one of said plurality of objects in isolation from the other of the plurality of objects; and
   a control system which causes each of said plurality of objects to be successively displayed on said electronic display, and which manipulates the lighting system such that, while each of said plurality of objects is being displayed on said electronic display, the object being displayed is simultaneously highlighted in said at least one display case by the lighting system.

2. A method for displaying objects, comprising:
   providing at least one display case equipped with a lighting system;
   providing an electronic display spaced apart from said display case;
   arranging a plurality of objects in said at least one display case;
   displaying an image of each of said plurality of objects on said electronic display in isolation from the other of the plurality of objects; and
   while each image of each of said plurality of objects is being displayed on said electronic display, highlighting that object in the at least one display case with the lighting system;
   wherein displaying an image of each of said plurality of objects on said electronic display includes presenting a slideshow of the plurality of objects on said electronic display.

3. The method of claim 2, wherein highlighting an object in the display case with the lighting system includes illuminating the highlighted object such that it appears brighter than the rest of the plurality of objects.

4. The method of claim 2, wherein highlighting an object in the display case with the lighting system includes illuminating the highlighted object in a wavelength of light that is different than wavelengths of light used to illuminate the rest of the plurality of objects.

5. The method of claim 2, wherein highlighting an object in the display case includes manipulating the lighting system such that the object appears brighter in said at least one display case than the rest of the plurality of objects.

6. The method of claim 2, wherein highlighting that object in the at least one display case with the lighting system is accomplished with a control system, wherein said control system is a computer equipped with a screen, and wherein said electronic display is said screen.

7. The method of claim 6, wherein said computer is further equipped with (a) a tangible, non-transient memory device, and (b) a software program recorded in said memory device which generates a plurality of windows on the electronic display, and further comprising:
   displaying the plurality of windows on the electronic display in a predetermined sequence.

8. The method of claim 7, further comprising:
   repeating said predetermined sequence until the program is interrupted.

9. The method of claim 7, further comprising:
   repeating said predetermined sequence until the program is stopped or paused.

10. The method of claim 7, further comprising:
    displaying each window in the sequence on the electronic display for a predetermined amount of time.

11. The method of claim 7, further comprising:
    displaying the plurality of windows on the electronic display as a slideshow.

12. The method of claim 2, wherein the at least one display case is a plurality of display cases.

13. The method of claim 2, wherein the at least one display case includes a display case with a plurality of shelves, and wherein at least one of the plurality of objects is disposed on each of the plurality of shelves.

14. The method of claim 13, wherein the lighting system includes a plurality of light fixtures, and wherein each of the plurality of light fixtures is arranged to illuminate exactly one of the plurality of objects.

15. The method of claim 2, wherein the control system has a tangible, non-transient memory system associated therewith having suitable programming instructions recorded therein which, when executed by at least one processor, cause a presentation to be displayed on the electronic display, wherein the presentation includes a succession of windows, and wherein each window in the succession of windows contains information about one of the plurality of products.

16. The method of claim 15, wherein the presentation is a slideshow.

17. The method of claim 2, wherein the navigational control device contains at least one input device, and further comprising:

using input from the at least one input device to manipulate the lighting system such that each of the plurality of objects is highlighted in succession.

18. The method of claim 17, further comprising:

receiving, at the control system, user input from the navigational control device; and in response to the input received from the user, advancing the presentation to a window having information which corresponds to the last of the plurality of products to be highlighted.

19. The method of claim 18, further comprising:

illuminating, while one of the plurality of objects is being highlighted, the one of the plurality of objects with greater intensity than any of the other of the plurality of objects.

* * * * *